3,553,776
PELLETIZER DIE PLATE
Alfred P. Romagano, Monroe, and Arthur D. Stevens, Hamilton, Ohio, assignors to The Black Clawson Company, Hamilton, Ohio, a corporation of Ohio
Filed Sept. 23, 1968, Ser. No. 761,676
Int. Cl. B29f 3/08
U.S. Cl. 18—12                                                4 Claims

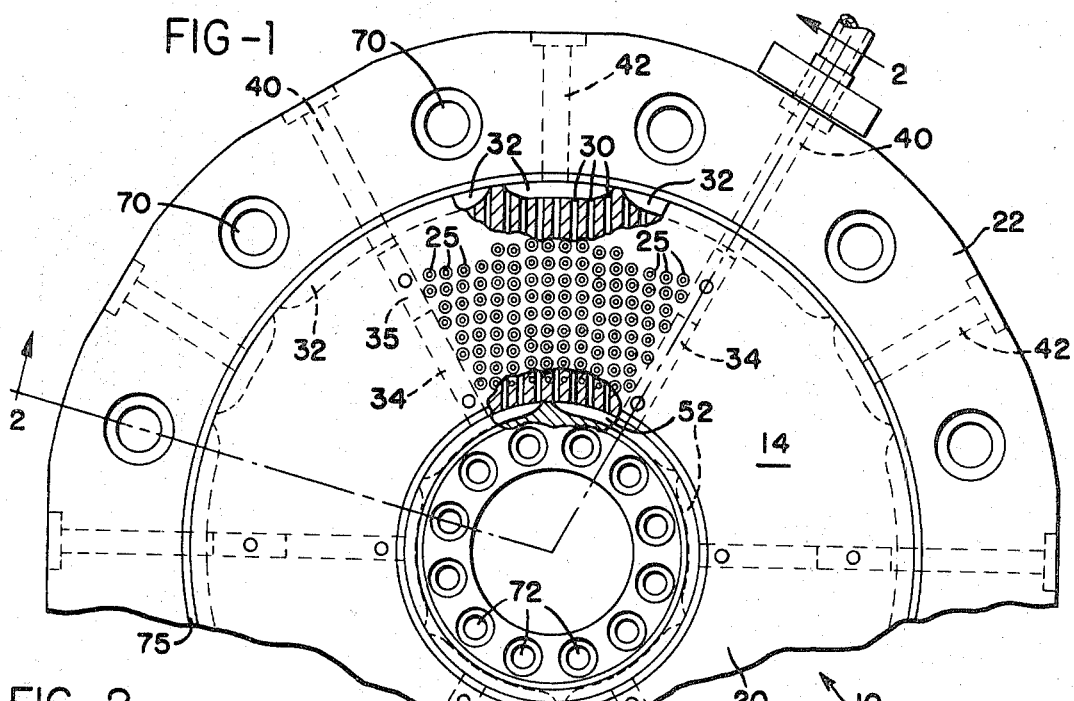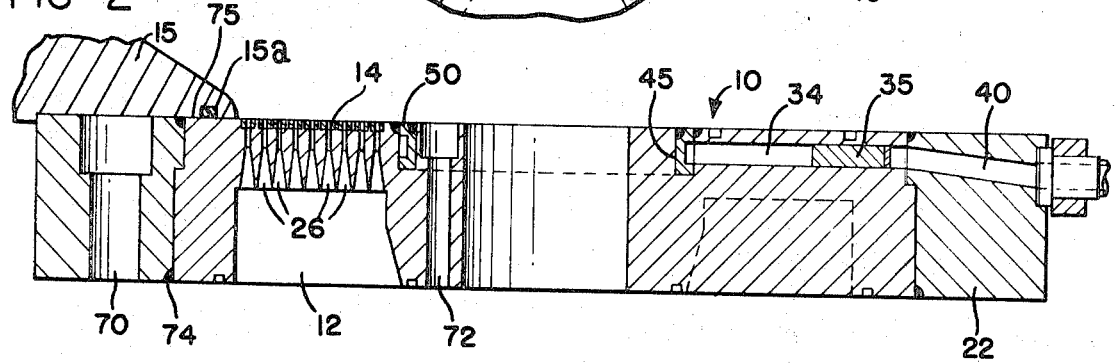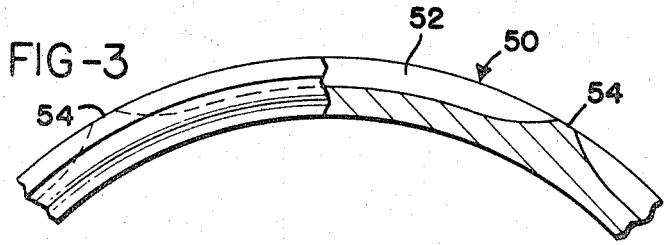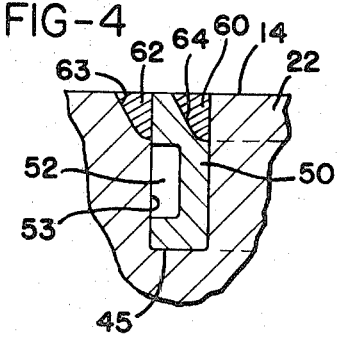
Jan. 12, 1971  A. P. ROMAGANO ET AL  3,553,776
PELLETIZER DIE PLATE
Filed Sept. 23, 1968
INVENTORS
ALFRED P. ROMAGANO &
ARTHUR D. STEVENS
BY
Marechal, Biebel, French & Bugg
ATTORNEYS

United States Patent Office 3,553,776
Patented Jan. 12, 1971

ABSTRACT OF THE DISCLOSURE

A die plate for a plastic material pelletizer having concentric interfitted inner and outer body portions with an annularly arranged pattern of orifice nozzles formed in the inner body portion through which plastic material is extruded and cut into pellets, with heating passages also formed in the inner portion generally radially between rows of nozzles. The heating passages open inwardly into an annular groove formed in the face of the die plate inwardly of the nozzle pattern. An annular insert is received within the groove and forms turn-around cavities for connecting groups of such heating passages with adjacent groups of passages.

RELATED APPLICATIONS

This application is related to the copending applications of Swickard et al., S.N. 642,880, filed June 1, 1967, now U.S. Pat. No. 3,461,495 and Gove et al., S.N. 620,515 filed Mar. 3, 1967, now U.S. Pat. No. 3,427,685 both assigned to the same assignee as this invention, and in certain aspects is an improvement over the die plate structures shown in those applications.

BACKGROUND OF THE INVENTION

Multiple-piece die plates are now commonly employed in plastic material pelletizers such as shown in the above-identified copending applications and also as shown in Swickard et al. 3,287,764 of 1966. The several die plates thus shown and described have resulted in certain substantial improvements over previously available die plates, particularly in the maintenance of a uniform temperature at the nozzles throughout the plate, while providing a relatively high density packing of nozzles per unit area, and the relatively simplified construction by use of multiple interfitted parts. The heating passageways for the nozzles in such cases have been shown as being extended through an intermediate part, and closed at the inner and outer annular parts which cooperate with the intermediate part to form turn-around passages or cavities resulting in an inward and outward flow of heating fluid through the heating passages.

In assembly, the parts of the die plate are joined by welds, and these welds must necessarily be fluid-tight under the extreme working conditions of pressure and temperature to prevent the heating fluid from leaking into the polymer or into the pellet-collecting housing. In such die plate constructions, it is accordingly important to assure the integrity of the welds, particularly on the high pressure side of the die where such welds are most subject to stress and possible failure.

SUMMARY OF THE INVENTION

In the present invention, one of the welds on the high pressure side of the die plate is eliminated, and the inner die plate section is formed with a groove on the low pressure side of the plate positioned annularly inwardly of the extrusion orifices. An annular insert is received within the groove and forms the turn-around cavities for interconnecting groups of the heating passageways, so that the flow of heating fluid is directed first inwardly and then outwardly. The insert is welded to the die plate exclusively at the low pressure side or the cutting face side of the die plate, and as such, the welds are not subject to high thermal and mechanical stress. Therefore, it is much easier to maintain the integrity of such welds throughout an extended life of the die plate.

It is accordingly an important object of the invention to provide a die plate formed primarily of the two major annular parts including an inner part within which are formed extrusion orifices, and which provides the inner support for the die plate, and a surrounding outer part, in which the inner part is formed with an annular groove into which the generally radially extending heating passages open, and an inset or insert is received within the groove and forms the turn-around cavities for the inner ends of the heating passages.

Another object of the invention is the provision of a plastic pelletizer die plate formed of two annular concentric sections. The inner of such annular sections is formed with generally radially extending heating passages formed between rows of nozzle orifices opening into an annular groove formed in the face of the die plate, and an insert is received within the face for forming the turn-around passageways with the groove and is welded to the inner die plate section exclusively on the low pressure side of the die.

BRIEF DESCRIPTION OF THE DRAWINGS

FIG. 1 is a plan view, partially broken away, of a die plate constructed according to this invention;

FIG. 2 is a transverse section through the die plate taken generally along the lines 2—2 of FIG. 1 and showing a fragment of the pellet collecting housing;

FIG. 3 is a fragmentary, partially-broken away view of the die plate insert; and FIG. 4 is an enlarged fragmentary transverse section through the inner die plate groove and insert.

Referring to the figures of the drawing which illustrate a preferred embodiment of the invention, a die plate for a plastic material pelletizer is shown generally at 10. The die plate 10 may thus be employed within plastic pellet cutting apparatus such as that shown in U.S. Pat. No. 3,287,764, and is formed with an inlet side 12 into which the plastic material flows, and a cutting or low pressure face 14 against which a series of knives rotate to sever the extruded plastic material to form beads or pellets of plastic material within the confines of a water tight pellet-collecting housing, a fragment of which is shown at 15 in FIG. 1.

The die plate 10 is formed generally in two major body portions or sections, comprising an inner body section 20 and an outer body section 22 formed in closely interfitting and surrounding relation to the section 20. The inner section 20 includes means defining a generally annular pattern of extrusion nozzles indicated at 25 in FIG. 1. The nozzles may be formed with carbide inserts or tips as described for example in U.S. Pat. No. 3,323,170 and form the terminal ends of generally axially aligned groups of extrusion passages, as shown at 26 in FIG. 2, leading from the inlet side 12 to the cutting side 14 of the die 10.

Preferably the nozzles 25 are arranged in a regular pattern defining generally radially extending nozzle rows with a space between each row.

For the purpose of applying heat to the extruding passages 26 and the nozzles 25 there are provided a plurality of generally radially extending heating fluid conducting passages 30 which are positioned in the spaces between the rows of nozzles so as to apply heat uniformly to each nozzle row. The heating passages 30 open into the manifolds 32 formed at the outer periphery of the inner section 20. There are also provided in the die plate a plurality of arcuately spaced and generally radially extending openings 34, the outer ends of which are closed by cylindrical plugs 35. The arrangement of nozzles and heating passages as disclosed herein is substantially the same as that described and claimed in the above-identified U.S. copending application S.N. 642,880 and is one which permits a generally rectangular and uniformly close spacing of the indivdual nozzles 25, while retaining an annular pattern of such nozzles. Accordingly, the manifolds 32 are spaced arcuately to encompass groups of heating passages 30 for distributing heating fluid which is received from radially aligned inlets 40 formed in the outer section 22 and to discharge the heating fluid to arcuately spaced outlets 42 also formed in the outer section 22.

Means in the inner section 20 defining turn-around cavities or chambers for the heating passages 30 and the manifolds 32 comprises an annular groove 45 which is formed in the low pressure face 14 of the section 20 radially inwardly of the annular pattern of nozzles. The groove 45 is generally rectangular in cross section and extends axially a short distance or depth into the section 20. The depth of the groove is at least equal to, and preferably slightly in excess of the corresponding depth of the passages 30 and manifold openings 34. The groove 45 intercepts the inner ends of the longer ones of the passages 30 and also intercepts the inner ends of the openings 32. These may thus be formed by drilling or boring into the section 20 from the outer periphery and permitting the tool to extend into the groove 45.

An annular ring-like inset or insert 50, as shown in FIGS. 3 and 4, is received within the groove 45 and has means in the inner surface thereof forming turn-around chambers or cavitiess 52. Each cavity 52 encompasses a group of the passages 30 as well as one of the manifolds 32. The insert 50 is dimensioned to form a relatively close and tight fit with the vertical walls and the bottom of the groove 45. The cavities 52 are closed by the adjacent wall 53 of the groove 45 and are further defined in an arcuate sense by lands 54 on the insert 50 which form a relatively close fit within the inside wall 53. The insert 50 is thus of U-shaped cross section at the cavities 52.

The cavities or chambers 52 which are thus formed by the insert ring 50 are staggered in relation to the manifolds 32 formed in the outer periphery of the section 20 to affect a reversal of fluid flow. In other words, the heating fluid which is admitted into one of the manifolds 32 is caused to flow first inwardly through one group of the passages 30 and then it is divided at the sealing land 54 into adjacent chambers 52 and caused to flow outwardly through the adjacent groups of passages 30.

The ring insert 50 is sealed exclusively at the low pressure side of the plate 10 by welds 60 and 62 as shown in FIG. 4. For this purpose, one side wall of the groove 45 may be chamfered as indicated at 63, and the inner wall of the ring 45 at the upper portion thereof may be similarly chamfered at 64 to provide annular cavities to receive the weld material.

The outer section 22 is provided with counter-bored openings 70 by means of which the die plate is supported in position on the pelletizer. The inner section 20 is similarly formed with counter-bored openings 72 by means of which the die plate may be centrally supported on a support mandrel as shown in U.S. Pat. No. 3,287,764. The outer section 22 is secured to the inner section 20 by a pair of circumferential welds 74 and 75. These welds are so positioned in relation to the pellet housing 15 and the housing seal 15', as shown in FIG. 2 so that if any leakage should occur of the heating fluid at the welds, the heating fluid will flow harmlessly outwardly rather than inwardly into the slurry of pellets and water within the housing 15.

The die plate of the present invention thus differs primarily from that disclosed in Ser. No. 642,880 by reason of the fact that the die plate body is made primarily of two, rather than three, interfitted sections. The inner turnaround cavities are formed by the annular groove 45 and the ring insert 50, with the elimination of an additional weld on the high pressure side of the die plates as compared to the structure shown in S.N. 642,880. Accordingly, the welds 70 and 72 sealing the insert 50 within the groove 45 are not subject to high forces, since they are not required to carry the load of externally applied extrusion pressure. Rather, they are only required to seal relatively the lower pressure of the heat exchange fluid, which may be heated oil, steam, or other heat exchange medium. Since the welds 70 and 72 are not subject to relatively high thermal stresses, they are thus less subject to deterioration over long periods of use.

While the form of apparatus herein described constitutes a preferred embodiment of the invention, it is to be understood that the invention is not limited to this precise form of apparatus and that changes may be made therein without departing from the scope of the invention.

What is claimed is:

1. An improved die plate for a pelletizer comprising an inner plate-like section having an inlet face on one side and a cutting face on the other side, an outer section formed in closely surrounding relation to said inner section, means in said inner section forming an annular pattern of extrusion passages extending generally axially therethrough from said inlet face terminating in extrusion orifices lying generally in a common plane on said cutting face, means in said inner section defining a plurality of generally radially extending heating fluid passages therethrough positioned adjacent said extrusion passages for applying heat thereto, an annular groove formed in said inner section radially inwardly of said pattern and opening into said cutting face with said radially extending passages being opened into said groove, means in said outer section for applying heating fluid to said passageways, and an annular insert received in said groove and forming turn-around cavities for connecting groups of said heating fluid passageways with adjacent groups of said heating fluid passages providing for return flow of such heating fluid.

2. The die plate of claim 1 in which said insert at said cavities is generally U-shaped in cross-section with the opening thereof facing radially inwardly and being closed by the adjacent wall of said groove.

3. The die plate of claim 1 in which said insert is welded to said inner section exclusively at said cutting face.

4. An improved die plate for a pelletizer comprising an inner plate-like section having an inlet face on one side thereof and a cutting face on the other side thereof, an outer section formed in closely surrounding relation to said inner section, means in said inner section forming an annular pattern of extrusion passages extending generally axially therethrough from said inlet face terminating in a corresponding number of extrusion orifices lying generally in a common plane on said cutting face, means in said inner section defining a plurality of generally radially extending heating fluid passages therethrough positioned in the spaces between said extrusion passages for applying heat to said die plate, an annular groove formed in said inner section radially inwardly of said pattern and opening into said cutting face and intercepting the inner ends of at least some of said radially extending passages, means in said outer section for applying heating fluid to selected groups of said passageways, and an annular insert received in said groove and forming turn-around cavities for connecting certain of said heating fluid passages with adjacent said heating fluid passages providing for return flow of heating fluid, said insert being welded to said inner section exclusively at said cutting face.

References Cited

UNITED STATES PATENTS

| | | | |
|---|---|---|---|
| 3,287,764 | 11/1966 | Swickord, Jr. et al. | 18—12(A) |
| 3,323,170 | 6/1967 | Swickord, Jr. et al. | 18—12(A) |
| 3,427,685 | 2/1969 | Grove et al. | 18—12(A) |
| 3,452,394 | 7/1969 | McNeal, Jr. | 18—12(A) |
| 3,461,495 | 8/1969 | Swickord et al. | 18—12(A) |

J. SPENCER OVERHOLSER, Primary Examiner

R. L. SPICER, Jr., Assistant Examiner